April 5, 1955   E. GIORDANO   2,705,445
CULTIVATOR ATTACHMENT
Filed April 16, 1953   2 Sheets-Sheet 1

INVENTOR
*Enrico Giordano.*

BY *Hyman Hurwitz*
ATTORNEY

April 5, 1955   E. GIORDANO   2,705,445
CULTIVATOR ATTACHMENT
Filed April 16, 1953   2 Sheets-Sheet 2

INVENTOR
Enrico Giordano.
BY Hyman Hurwitz
ATTORNEY

2,705,445

CULTIVATOR ATTACHMENT

Enrico Giordano, West Long Branch, N. J.

Application April 16, 1953, Serial No. 349,170

1 Claim. (Cl. 97—47.33)

The present invention relates generally to cultivators of the tractor driven type, and more particularly to cultivators of the tractor driven type in which the cultivator shoes are located intermediate the forward and rearward wheels of the tractor, and raised and lowered, and otherwise controlled, by the occupant and driver of the tractor. Thereby, the necessity for a trailer cultivator, operated by personnel additional to the man operating the tractor, is obviated.

In cultivators of the type forming the subject matter of the present invention, one of the serious problems encountered is that of rendering the mechanism flexible in operation, readily adjustable, and readily removable from and replaceable on the tractor, while retaining the required strength and rigidity of the parts.

It is an object of the present invention to provide a novel cultivator attachment for tractors, mounted intermediate the forward and rearward wheels of the tractor, which shall be readily removable, adjustable and replaceable, and is comprised of a small number of economically constructed and sturdy parts.

It is a more specific object of the invention to provide a novel draw bar for cultivator shoes, which shall enable sturdy and rigid mounting of the shoes but permit rapid and easy adjustment of shoe position, and rapid and easy removal and replacement of shoes.

It is another specific object of the invention to provide a simple and sturdy cultivator shoe draw bar assembly, capable of rapid removal from a tractor by a simple unbolting operation, involving a minimum number of bolts.

The above and still further features, objects and advantages of the present invention will become apparent upon consideration of the following detailed description of a specific embodiment thereof, especially when taken in conjunction with the accompanying drawings, wherein.

Figure 1:
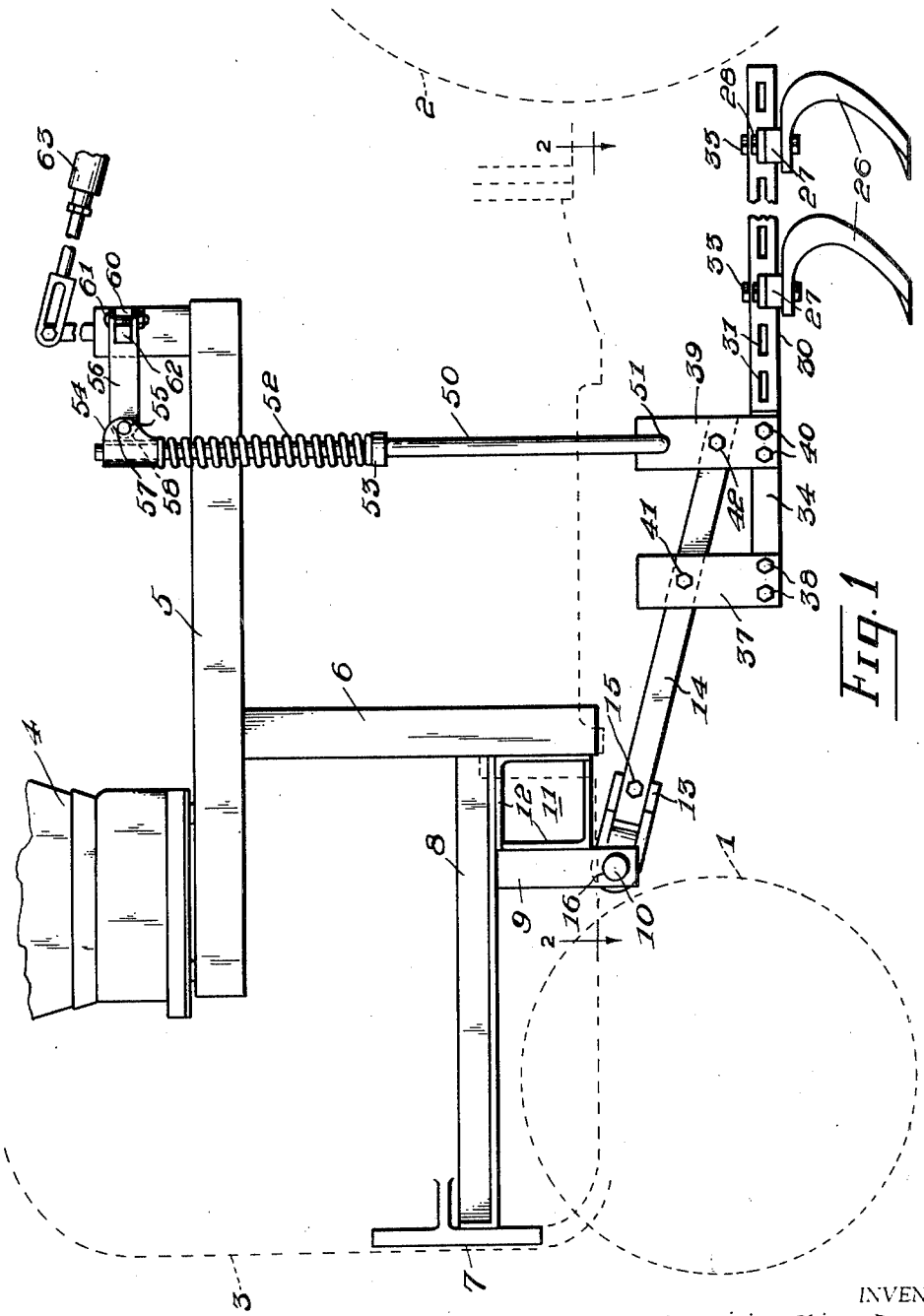
Figure 1 is a view in side elevation of a cultivator mounted on a tractor at a position intermediate the forward and rearward wheels.
Figure 2:
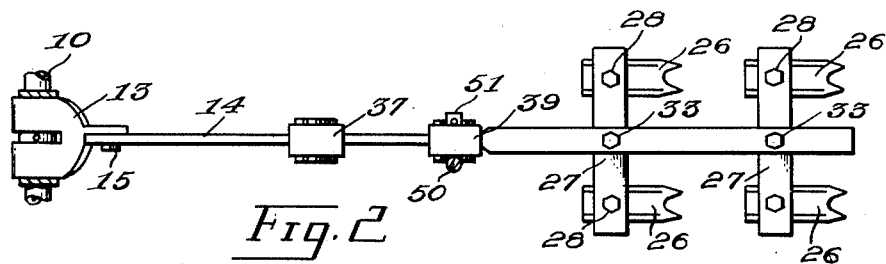
Figure 2 is a view in plan of a draw bar assembly for tractor shoes, employed in the cultivator of Figure 1.

Referring now more specifically to the accompanying drawings, the reference numeral 1 identifies the forward wheels, and the reference numeral 2 the rearward wheels of a tractor, of a type sold commercially and widely used in farming. The dotted line 3 indicates generally the motor housing of the tractor, and the numeral 4 identifies a hopper, mounted over one of two longitudinally extending horizontal beams 5, at a position about midway vertically of the motor housing 3. Two beams 5 may be provided, one on each side of the tractor motor housing. Further beams 6 may extend vertically downwardly from the longitudinally extending beam 5, one on each side of the tractor, being bolted or welded to the beams 5 at a position slightly rearwardly of the forward wheels 1, and extending downwardly to a point slightly below the top of forward wheels 1. Between the vertical beam 6 and the forward part of the frame of the tractor, indicated at 7, is mounted a pair of horizontal beams 8, one on each side of the tractor, and extending generally parallel with the longitudinal axis of the tractor at a vertical level just clearing the tops of forward wheels 1. A plurality of brackets 9 depend from the horizontal beams 8, just rearwardly of wheels 1, and serve to support a transverse rod 10, extending substantially across the width of the tractor. To render the depending brackets 9 rigid, and to reduce the strain at the point of attachment of brackets 9 to beam 8, a spacer 11 is interposed between the brackets 9 and a portion of vertical beams 6 which extend below the level of the longitudinal beam 8. The spacer 11 is preferably in the form of a pair of L beams, 12, conjoined to form a square beam when viewed together.

The transverse rod 10, of circular cross-section, serves as a point of attachment for rearwardly extending brackets 13, capable of pivoting about the rod 10, and to the brackets 13 are rigidly secured extension rods 14, each extension rod being secured to its bracket 13 by means of a single bolt 15, to enable rapid and easy detachment.

Figure 3:
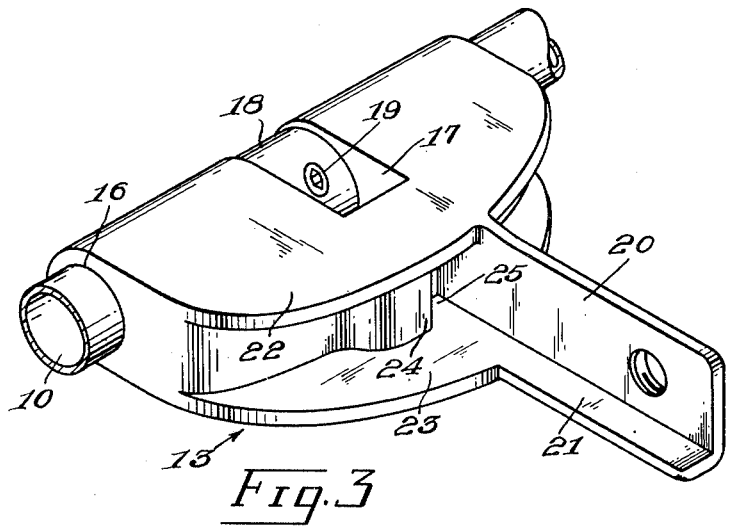
Figure 3 is a view in perspective of a pivotable bracket for securing the draw bar assembly of Figure 2 to a transverse rod on the tractor.
Figure 4:
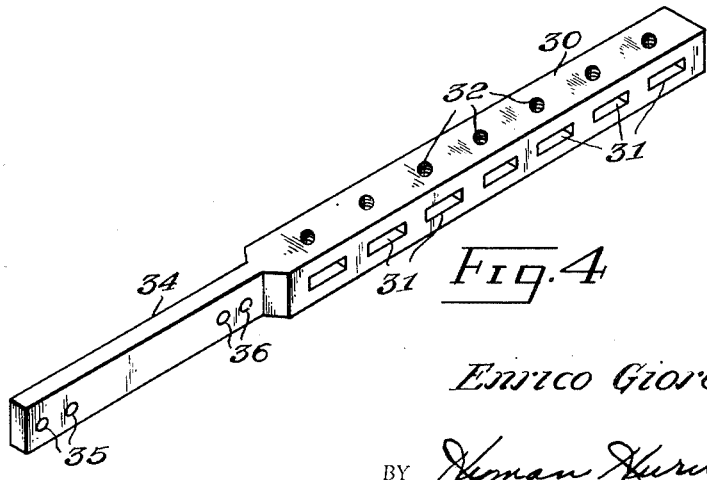
Figure 4 is a view in perspective of a cultivator shoe support bar, employed in the draw bar assembly of Figures 1 and 2.

Referring now more specifically to Figure 3 of the accompanying drawings, there is illustrated in detail the structure of one of the brackets 13, and its mode of attachment to transverse rod 10. The bracket 13 is provided with an aperture 16, encompassing the rod 10, the fit being sufficiently snug that play is prevented, but rotation of the bracket 13 on the rod 10 is permitted. A slot 17 is cut in the bracket 13, centrally of its width, and of sufficient depth to expose the rod 10, and a collar 18 is fitted about the rod 10 within the slot 17. The width of the slot 17 and the collar 18 conform, and the collar 18 is rendered immovable with respect to the rod 10 by means of a set screw 19. Thereby movement of the bracket 13 endwise of the rod 10 is prevented, without interfering with its freedom to pivot. At the same time the lateral position of the bracket 13 along the rod 10 may be easily and quickly modified, by loosening the set screw 19 and manually forcing the bracket 13 to a new lateral position, after which the set screw 19 may be again tightened.

The bracket 13 is provided with a long thin walled extension 20, extending in a vertical plane, and a generally horizontal shelf 21 extends to one side of the thin walled extension 20. Upper and lower lips 22 and 23 are provided, overlying the thin walled extension 20, and extending rearwardly parallel with shelf 21, and a short thick-walled extension 24 is further provided, extending parallel to the long thin walled extension 20. Thereby, a rectangular recess 25 is provided, which is of the proper shape and size to receive snugly one end of the extension rod 14. The latter lies along the thin walled extension 20, and rests on the shelf 21, when in assembled position. An aperture is provided in the thin walled extension 20, and a mating aperture in the extension rod 14, to enable joining these members by means of bolt 15. The extension rod is thus rigidly coupled with bracket 13, and is rendered immovable relative thereto when bolted, but its removal may be accomplished by removal of but a single bolt.

Conventional cultivator shoes, as 26, are employed in the practice of the invention, and are bolted in pairs to straps 27, by means of bolts 28, adjacent to the ends of the strap. The straps are secured to a draw bar, 30, in the shape of a substantially rectangular elongated rod, having six transverse rectangular slots 31 therethrough, of a size snugly to receive straps 27. The width of the bar 30 is sufficiently great that the straps 27 are held against twisting and turning in the slots 31, and to insure against lateral movement of the straps 27, threaded apertures 32 extend vertically through the draw bar 30 into the slots 31, to receive bolts 33. The straps 27 may be readily adjusted in respect to lateral position, by loosening bolts 33, but normally will be positioned to provide a balanced pull from a pair of cultivator shoes 26. Disassembly of a pair of cultivator shoes, and of a support strap 27, may obviously be accomplished by removal of two bolts. The straps may be located in any desired ones of slots 31, thereby enabling a wide variety of shoe spacings and positions.

The bar 30 is provided with an elongated extension 34, having the same height as rod 31, but about half the thickness. The extension 34 is provided with two pairs of apertures 35 and 36, each adjacent a different end of the extension.

A vertically extending metal plate 37 is bolted to extension 34 by means of bolts 38, extending through apertures 35. A similar plate 39 is bolted to extension 34 by means of bolts 40, extending through apertures 36. The extension rod 14 is bolted to plates 37 and 39, by means of bolts 41, 42, respectively, and at different vertical positions, so that extension rod 14 lies at an angle to the horizontal. Thereby, the draw bar 30 is enabled to lie horizontally at a first level, and to be secured pivotally to transverse rod 10, located at a higher level.

To the plate, 39, is secured a vertical rod 50, which has a hooked lower end 51, extending through an aperture in the upper portion of plate 39. A compression spring 52 encircles the upper half of vertical rod 50, its lower end being fixed by collar 53, and its upper end being compressed by a lever 54 having a pivot 55 which encircles the rod 50 above the spring 52, and a bar 56 which is pivotably secured to pivot 55 by means of a horizontal pin extending through ears 57 provided in pivot 55, and through a tongue 58 formed integrally with bar 56, and extending between the ears 57. The bar 56 is provided with a rectangular slot 60 in the end thereof remote from pivot 55, and the walls of slot 60 are apertured to receive a bolt 61 for securing the slot to a transverse shaft 62 of rectangular cross section. The transverse shaft 62 may be rotated about its longitudinal axis by means of a hydraulic cylinder 63 (or by hand, if desired), thereby to pivot the bar 56, and to depress or raise the rod 50. The force of depression serves to determine the depth to which the cultivator shoes 26 will work, the compression spring 52 then acting as a cushion against shock due to rough spots in the ground, rocks and stones, and the like.

In summary, the novel constructions of the present invention present a novel and valuable cultivator attachment, which can be quickly and readily secured in position on a tractor with ordinary tools, and which is susceptible of a wide range of easily effected adjustments of cultivator shoe positions, spacings between shoe pairs longitudinally or transversely of the tractor being quickly effected. One man is sufficient to operate the tractor and the cultivator. The cultivator attachment is rigidly secured to the tractor, and consists of a small number of economically and easily fabricatable parts, which are not liable to maintenance difficulties. The entire attachment can be dissassembled from the tractor in a relatively few minutes by an unskilled person, or secured to the tractor, and the position of the cultivator shoes may be varied, laterally, by a simple operation involving the loosening of a single set screw for each draw bar, and the concomitant adjustment of the appropriate lift rod connection to the transverse shaft. A large number of positions are provided for the cultivator shoes, and these may readily be moved from one slot to another, and the spacing of cultivator shoe pairs adjusted, as desired for a particular type of crop, or cultivation.

It will be clear that variations of general arrangement and of structural details may be resorted to without departing from the true scope of the invention, as defined in the appended claim.

What I claim is:

A cultivator attachment for a wheeled tractor, said tractor having a frame, a transverse horizontal rod located between the forward and rearward wheels of said tractor, means for securing said transverse horizontal bar immovably to and under said frame, a plurality of brackets, each having two transverse spaced integral apertured members encircling said bar, the space between said apertured members forming a slot which exposes said bar, a collar encircling said bar within said slot, means for securing said collar to said bar, a plurality of draw bars, means for securing each of said draw bars to a different bracket comprising a four-walled recess in said bracket for receiving one end of said draw bar, two conjoined walls of said recess extending outwardly from said bracket adjacent two sides of said draw bar, bolt means for securing said draw bar to one of said extended conjoined walls, a plurality of pairs of cultivator shoes, each of said pairs of cultivator shoes being secured to a transverse strap of rectangular cross section, each of said draw bars having a portion including a plurality of transverse rectangular slots, each dimensioned to snugly receive one of said straps, a threaded member extending into each slot for clamping a strap therein, a rectangular shaft extending transversely of said tractor frame and rotatably mounted thereon, a plurality of levers secured to said shaft, a plurality of vertically disposed rods, means for mechanically coupling one end of each of said vertically disposed rods to a different one of said draw bars, the other end of each of said vertically disposed rods being pivotally secured to a different one of said levers and means for pivoting said rectangular shaft about its longitudinal axis.

References Cited in the file of this patent

UNITED STATES PATENTS

| 215,385 | Mitchell | May 13, 1879 |
| 397,403 | Wagner | Feb. 5, 1889 |
| 519,631 | Hoke | May 8, 1894 |
| 556,112 | Teal | Mar. 10, 1896 |
| 976,490 | Packham | Nov. 22, 1910 |
| 1,814,693 | Harris | July 14, 1931 |
| 1,946,403 | Johnson | Feb. 6, 1934 |
| 1,981,228 | Ganaway | Nov. 20, 1934 |
| 2,327,937 | Smith | Aug. 24, 1943 |

FOREIGN PATENTS

| 311,152 | Germany | Feb. 25, 1919 |